(12) United States Patent
Wang

(10) Patent No.: US 10,922,444 B2
(45) Date of Patent: Feb. 16, 2021

(54) METHOD AND APPARATUS FOR DISPLAYING APPLICATION INTERFACE

(71) Applicant: Beijing Xiaomi Mobile Software Co., Ltd., Beijing (CN)

(72) Inventor: Ke Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 165 days.

(21) Appl. No.: 16/140,170

(22) Filed: Sep. 24, 2018

(65) Prior Publication Data
US 2019/0095654 A1 Mar. 28, 2019

(30) Foreign Application Priority Data
Sep. 27, 2017 (CN) .......................... 201710888224.4

(51) Int. Cl.
*G06F 21/84* (2013.01)
*G06F 3/14* (2006.01)
*G06F 3/0484* (2013.01)

(52) U.S. Cl.
CPC .......... *G06F 21/84* (2013.01); *G06F 3/04847* (2013.01); *G06F 3/1454* (2013.01);
(Continued)

(58) Field of Classification Search
CPC .... G06F 21/84; G06F 3/1454; G06F 3/04847; G06F 2221/032; G06F 3/04883;
(Continued)

(56) References Cited

U.S. PATENT DOCUMENTS 9,406,157 B2 * 8/2016 Liu .......................... G06T 11/60
10,021,085 B1 * 7/2018 Wu ....................... H04L 63/0428
(Continued)

FOREIGN PATENT DOCUMENTS

CN 104317620 A 1/2015
CN 105956486 A 9/2016
(Continued)

OTHER PUBLICATIONS

Combined Russian Office Action and Search Report dated Jul. 11, 2019 in Russian Patent Application No. 2018137223 (with English translation), 18 pages.
(Continued)

*Primary Examiner* — Aravind K Moorthy
(74) *Attorney, Agent, or Firm* — Oblon, McClelland, Maier & Neustadt, L.L.P.

(57) ABSTRACT

The disclosure relates to a method and apparatus for displaying an application interface. The method includes detecting a starting operation over a specified application; in response to detecting the starting operation over the specified application, determining whether the specified application is a secret-related application; when the specified application is determined to be the secret-related application, acquiring an encrypted display manner of the specified application; and sending application interface data and the encrypted display manner of the specified application to a first terminal based on a network connection pre-established with the first terminal, wherein the application interface data is used by the first terminal to generate an application interface of the specified application, and the encrypted display manner is used by the first terminal to display the application interface with an encrypted effect.

8 Claims, 9 Drawing Sheets

(52) U.S. Cl.
CPC ... *G06F 2221/032* (2013.01); *G09G 2354/00* (2013.01); *G09G 2358/00* (2013.01); *G09G 2370/04* (2013.01); *G09G 2370/06* (2013.01); *G09G 2370/16* (2013.01)

(58) Field of Classification Search
CPC . G06F 21/6218; G06F 21/74; G09G 2358/00; G09G 2370/06; G09G 2354/00; G09G 2370/04; G09G 2370/16; H04L 63/0428; H04M 1/72563; H04M 1/72583
See application file for complete search history.

(56) References Cited

U.S. PATENT DOCUMENTS

| | | | | |
|---|---|---|---|---|
| 2002/0076053 | A1* | 6/2002 | Hachimura | H04L 69/329 380/277 |
| 2003/0212899 | A1* | 11/2003 | Curtis | G06Q 20/389 726/27 |
| 2005/0257043 | A1* | 11/2005 | Adams | H04L 63/0428 713/153 |
| 2006/0036873 | A1* | 2/2006 | Ho | H04L 29/06 713/186 |
| 2007/0136466 | A1 | 6/2007 | Etelapera | |
| 2008/0034435 | A1 | 2/2008 | Grabarnik et al. | |
| 2008/0282356 | A1 | 11/2008 | Grabarnik et al. | |
| 2010/0138656 | A1* | 6/2010 | Chinen | G06F 21/577 713/168 |
| 2011/0206200 | A1* | 8/2011 | Sovio | H04L 9/3073 380/30 |
| 2011/0235799 | A1* | 9/2011 | Sovio | H04L 9/3073 380/30 |
| 2013/0179985 | A1* | 7/2013 | Strassmann | G06F 21/60 726/26 |
| 2013/0262853 | A1* | 10/2013 | Arie | H04L 67/2833 713/150 |
| 2014/0215356 | A1* | 7/2014 | Brander | G06F 3/14 715/753 |
| 2014/0373102 | A1* | 12/2014 | Fujimoto | H04L 12/2812 726/4 |
| 2015/0013013 | A1* | 1/2015 | Li | G06F 21/60 726/26 |
| 2015/0143117 | A1* | 5/2015 | Freeman | H04L 63/0428 713/168 |
| 2015/0278534 | A1 | 10/2015 | Thiyagarajan et al. | |
| 2015/0302218 | A1* | 10/2015 | Fielder | G06F 21/6209 713/193 |
| 2015/0302621 | A1 | 10/2015 | Liu et al. | |
| 2015/0304484 | A1* | 10/2015 | Halmstad | H04W 48/04 455/419 |
| 2015/0372994 | A1* | 12/2015 | Stuntebeck | H04L 63/0281 713/156 |
| 2016/0124701 | A1* | 5/2016 | Wang | G06F 3/1431 345/2.2 |
| 2016/0182613 | A1* | 6/2016 | Brune | G06F 1/1698 709/217 |
| 2016/0188317 | A1* | 6/2016 | Hilliar | G06F 8/71 717/172 |
| 2016/0205082 | A1* | 7/2016 | Puderer | H04L 63/102 713/165 |
| 2016/0241530 | A1* | 8/2016 | Andreev | H04L 51/12 |
| 2016/0269376 | A1* | 9/2016 | Goyal | H04L 63/04 |
| 2016/0321457 | A1 | 11/2016 | Liu et al. | |
| 2016/0321968 | A1* | 11/2016 | Zhang | G09G 5/373 |
| 2017/0010791 | A1* | 1/2017 | Sakamoto | G06F 3/04812 |
| 2017/0124349 | A1* | 5/2017 | Anantapur Bache | G06F 21/6245 |
| 2017/0293776 | A1* | 10/2017 | Bolignano | G06F 21/84 |
| 2017/0300190 | A1* | 10/2017 | Wang | G06F 3/0482 |
| 2017/0308349 | A1 | 10/2017 | He et al. | |
| 2018/0091501 | A1* | 3/2018 | Trahe | H04B 1/3816 |
| 2018/0330118 | A1* | 11/2018 | Leung | H04L 9/088 |
| 2018/0343492 | A1* | 11/2018 | Konig | H04N 21/4122 |

FOREIGN PATENT DOCUMENTS

| | | |
|---|---|---|
| CN | 106331331 A | 1/2017 |
| CN | 106657651 A | 5/2017 |
| CN | 107682538 A | 2/2018 |
| EP | 3 123 705 A1 | 2/2017 |
| JP | 2009-508262 A | 2/2009 |
| JP | 2012-203889 A | 10/2012 |
| JP | 2015-215758 A | 12/2015 |
| JP | 2016-532351 | 10/2016 |
| JP | 2017-511558 | 4/2017 |
| KR | 10-2016-0116037 | 10/2016 |
| RU | 2 597 512 C2 | 2/2015 |
| RU | 2 602 985 C2 | 7/2016 |
| WO | WO 2015/148441 A1 | 10/2015 |

OTHER PUBLICATIONS

International Search Report dated Aug. 8, 2018 in International Application No. PCT/CN2018/085008, 2 pages.
Extended European Search Report dated Jan. 16, 2019 in European Patent Application No. 18197265.4, 7 pages.
International Search Report dated Aug. 8, 2018 in PCT/CN2018/085008 (with English translation of categories of cited documents), 5 pages.
Written Opinion of the International Searching Authority dated Aug. 8, 2018 in PCT/CN2018/085008, 5 pages.
Japanese Office Action dated Jan. 20, 2020 in Japanese Patent Application No. 2018-568379 (with English translation), 12 pages.
Written Opinion of International Searching Authority dated Aug. 8, 2018 in PCT/CN2018/085008 (previously filed, now submitting English translation), 5 pages.
Second Office Action with English translation dated Sep. 29, 2020 in Japanese Patent Application No. 2016-568379, citing documents AA and AO-AS therein (10 pages).

* cited by examiner

METHOD AND APPARATUS FOR DISPLAYING APPLICATION INTERFACE

CROSS-REFERENCE TO RELATED APPLICATIONS

This application is based upon and claims priority to Chinese Patent Application No. 201710888224.4, filed on Sep. 27, 2017, the entire contents of which are incorporated herein by reference.

TECHNICAL FIELD

The present disclosure generally relates to the technical field of Internet, and more particularly, to a method and apparatus for displaying an application interface.

BACKGROUND

Along with development of the Internet technology, for better information sharing, many users may project application interfaces of small-screen terminals such as smart phones and tablet computers onto large-screen terminals such as projectors and smart televisions for display on the large-screen terminals.

For example, a large-screen terminal is a first terminal and a small-screen terminal is a second terminal. When an application interface is displayed, the following method may be adopted: the first terminal establishes a network connection with the second terminal; the second terminal sends application interface data of a specified application to the first terminal based on the established network connection; and when receiving the application interface data of the specified application, the first terminal generates an application interface of the specified interface according to the application interface data and displays the application interface.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for displaying an application interface. The method includes detecting a starting operation over a specified application; in response to detecting the starting operation over the specified application, determining whether the specified application is a secret-related application; when the specified application is determined to be the secret-related application, acquiring an encrypted display manner of the specified application; and sending application interface data and the encrypted display manner of the specified application to a first terminal based on a network connection pre-established with the first terminal, wherein the application interface data is used by the first terminal to generate an application interface of the specified application, and the encrypted display manner is used by the first terminal to display the application interface with an encrypted effect.

According to an aspect, when determining whether the specified application is a secret-related application, the method includes acquiring an application identifier of the specified application; and when the application identifier is as same as an application identifier of a preset secret-related application, determining that the specified application is the secret-related application.

According to another aspect, when acquiring the encrypted display manner of the specified application, the method includes acquiring an application identifier of the specified application; and acquiring the encrypted display manner corresponding to the application identifier from an encryption database based on the application identifier, wherein a corresponding relationship between application identifiers and encrypted display manners of encrypted applications is stored in the encryption database.

According to yet another aspect, after sending the application interface data and the encrypted display manner of the specified application to the first terminal, the method includes, during display of the application interface, upon detection of a sliding operation on the application interface, acquiring a sliding region of the sliding operation; and sending the sliding region to the first terminal, so as for the first terminal to display content of the application interface in the sliding region.

According to yet another aspect, before determining whether the specified application is the secret-related application, the method includes determining whether the first terminal is in a privacy protection mode; and when the first terminal is in the privacy protection mode, determining whether the specified application is the secret-related application.

Aspects of the disclosure also provide another method for displaying an application interface. The method includes receiving application interface data and an encrypted display manner of a specified application from a terminal based on a network connection pre-established with the terminal, wherein the specified application is an application being started at the terminal; generating an application interface of the specified application based on the application interface data; and displaying the application interface in the encrypted display manner.

According to an aspect, after displaying the application interface in the encrypted display manner, the method includes receiving a sliding region sent by the terminal, wherein the sliding region is determined based on a sliding operation detected by the terminal on the application interface; and displaying content of the application interface in the sliding region.

Aspects of the disclosure also provide an apparatus for displaying an application interface. The apparatus includes a processor and a memory configured to store instructions executable by the processor. The processor is configured to detect a starting operation over a specified application; in response to detecting the starting operation over the specified application, determine whether the specified application is a secret-related application; when the specified application is determined to be the secret-related application, acquire an encrypted display manner of the specified application; and send application interface data and the encrypted display manner of the specified application to a first terminal based on a network connection pre-established with the first terminal, wherein the application interface data are used by the first terminal to generate an application interface of the specified application, and the encrypted display manner is used by the first terminal to display the application interface with an encrypted effect.

Aspects of the disclosure also provide an apparatus for displaying an application interface. The apparatus includes a processor and a memory configured to store instructions executable by the processor. The processor is configured to receive the application interface data and the encrypted display manner of the specified application from the terminal based on the network connection pre-established with the terminal; generate the application interface of the specified application based on the application interface data; and display the application interface in the encrypted display manner.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Figure 1:
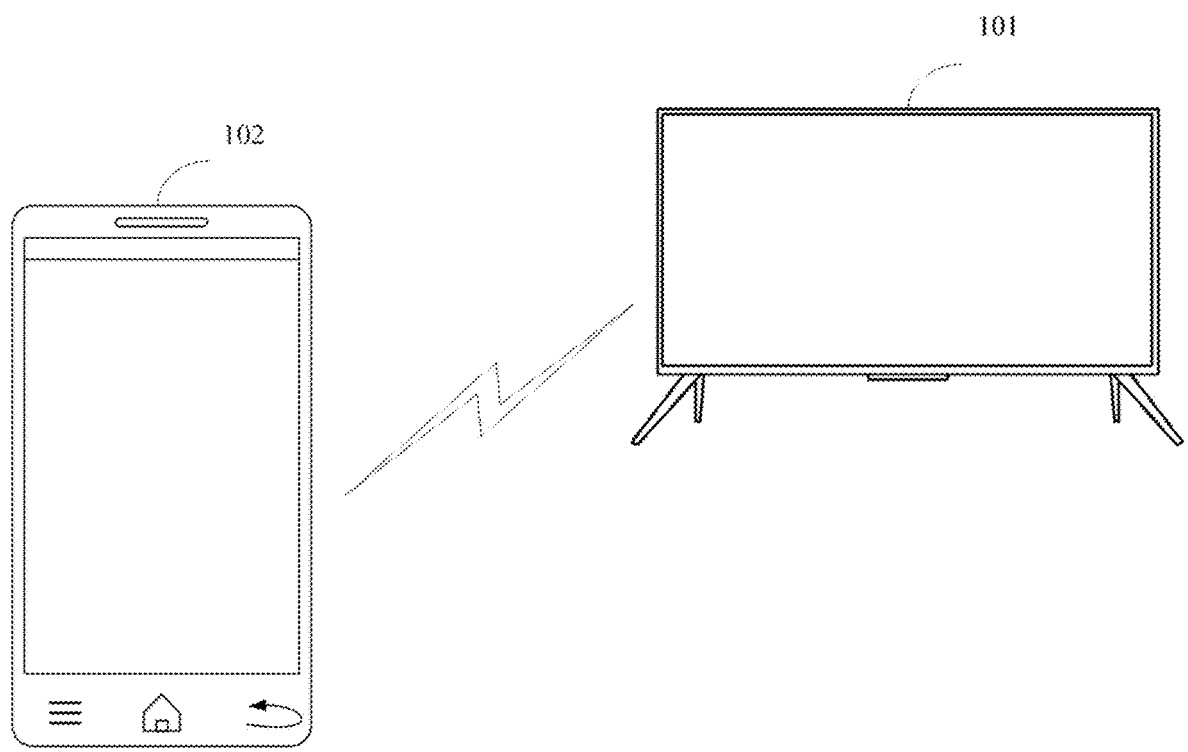
FIG. 1 is an environment in which a method for displaying an application interface according to an exemplary aspect of the present disclosure is implemented.

FIG. 1 is an environment in which a method for displaying an application interface according to an aspect of the present disclosure is implemented. Referring to FIG. 1, in the environment, a first terminal 101 and a second terminal 102 is included.

The first terminal 101 may be a large-screen device such as a projector and a smart television.

The second terminal 102 may be a small-screen device such as a smart phone and a tablet computer. For meeting a usage requirement of a user, various types of applications are installed in the second terminal, including a navigation application, a shopping application, a reading application, an audio play application, a video play application, a social application and a short message application, and these applications may be divided into secret-related applications (for example, the shopping application, the social application and the short message application) and secret-unrelated applications (for example, the navigation application, the reading application, the audio play application and the video play application) according to whether they are related to privacy of the user.

Both the first terminal 101 and the second terminal 102 have a network connection function, and based on the network connection function, the first terminal 101 and the second terminal 102 may establish a network connection through a wired network or a wireless network, thereby performing data transmission.

Figure 2:
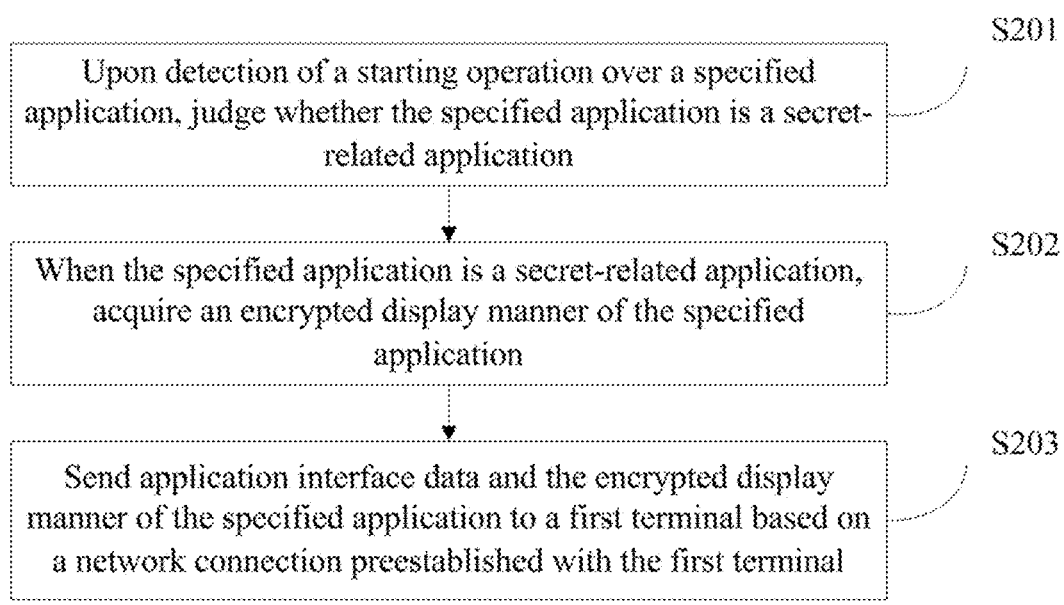
FIG. 2 is a flow chart showing a method for displaying an application interface according to an exemplary aspect of the present disclosure.

FIG. 2 is a flow chart showing a method for displaying an application interface according to an exemplary aspect. As shown in FIG. 2, the method for displaying the application interface is applied to a second terminal and includes the following steps.

In Step S201, upon detection of a starting operation over a specified application, it is judged whether the specified application is a secret-related application.

In Step S202, when the specified application is a secret-related application, an encrypted display manner of the specified application is acquired.

In Step S203, application interface data and encrypted display manner of the specified application are sent to a first terminal based on a network connection pre-established with the first terminal.

The application interface data are used by the first terminal to generate an application interface of the specified application, and the encrypted display manner is used by the first terminal to display the application interface with an encrypted effect.

According to the method provided by the aspect of the present disclosure, before the second terminal projects the application interface of the specified application to the first terminal, it is judged whether the specified application is a secret-related application, and when the specified application is a secret-related application, the application interface data and the encrypted display manner of the specified application are sent to the first terminal together, so as for the first terminal to display the application interface in the encrypted display manner, thereby providing a novel application interface display scheme which effectively avoids user privacy leakage.

In another aspect of the present disclosure, the operation of judging whether the specified application is a secret-related application includes the following steps.

An application identifier of the specified application is acquired.

When the application identifier is the same as an application identifier of a preset secret-related application, it is determined that the specified application is the secret-related application.

In another aspect of the present disclosure, the operation of acquiring the encrypted display manner of the specified application includes the following steps.

The application identifier of the specified application is acquired.

An encrypted display manner corresponding to the application identifier is acquired from an encryption database according to the application identifier, a corresponding relationship between application identifiers and encrypted display manners of encrypted applications being stored in the encryption database.

In another aspect of the present disclosure, after the operation of sending the application interface data and encrypted display manner of the specified application to the first terminal, the method further includes the following steps.

During display of the application interface, upon detection of a sliding operation on the application interface, a sliding region of the sliding operation is acquired.

The sliding region is sent to the first terminal for the first terminal to display content of the application interface in the sliding region.

In another aspect of the present disclosure, before the operation of judging whether the specified application is a secret-related application, the method further includes the following steps.

It is detected whether a present mode is a privacy protection mode.

When the present mode is the privacy protection mode, the step of judging whether the specified application is a secret-related application is executed.

All of the optional technical solutions may be freely combined into optional aspects of the present disclosure, which will not be elaborated herein one by one.

Figure 3:
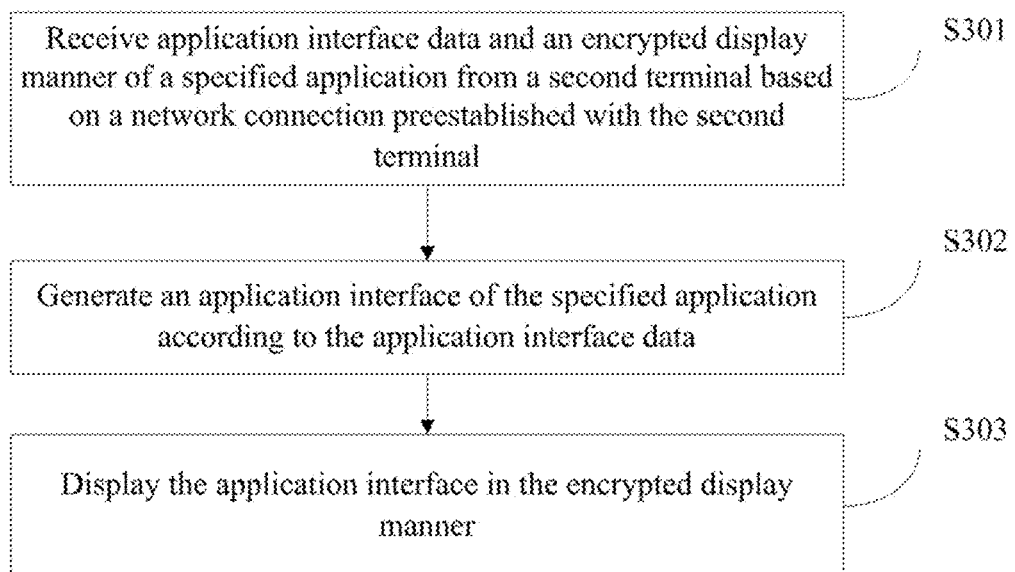
FIG. 3 is a flow chart showing another method for displaying an application interface according to an exemplary aspect of the present disclosure.

FIG. 3 is a flow chart showing a method for displaying an application interface, according to an exemplary aspect. As shown in FIG. 3, the method for displaying the application interface is applied to a first terminal and includes the following steps.

In Step S301, application interface data and an encrypted display manner of a specified application are received from a second terminal based on a network connection pre-established with the second terminal.

The specified application is an application being started at the second terminal.

In Step S302, an application interface of the specified application is generated according to the application interface data.

In Step S303, the application interface is displayed in the encrypted display manner.

According to the method provided by the aspect of the present disclosure, the application interface data and the encrypted display manner of the specified application are received from the second terminal, and the application interface is displayed in the encrypted display manner, thereby providing a novel application interface display scheme which effectively avoids user privacy leakage.

In another aspect of the present disclosure, after the operation of displaying the application interface in the encrypted display manner, the method further includes the following steps.

A sliding region sent by the second terminal is received. The sliding region is determined according to a sliding operation detected by the second terminal on the application interface.

Content of the application interface in the sliding region is displayed.

All of the optional technical solutions may be freely combined into optional aspects of the present disclosure, which will not be elaborated herein one by one.

Figure 4:
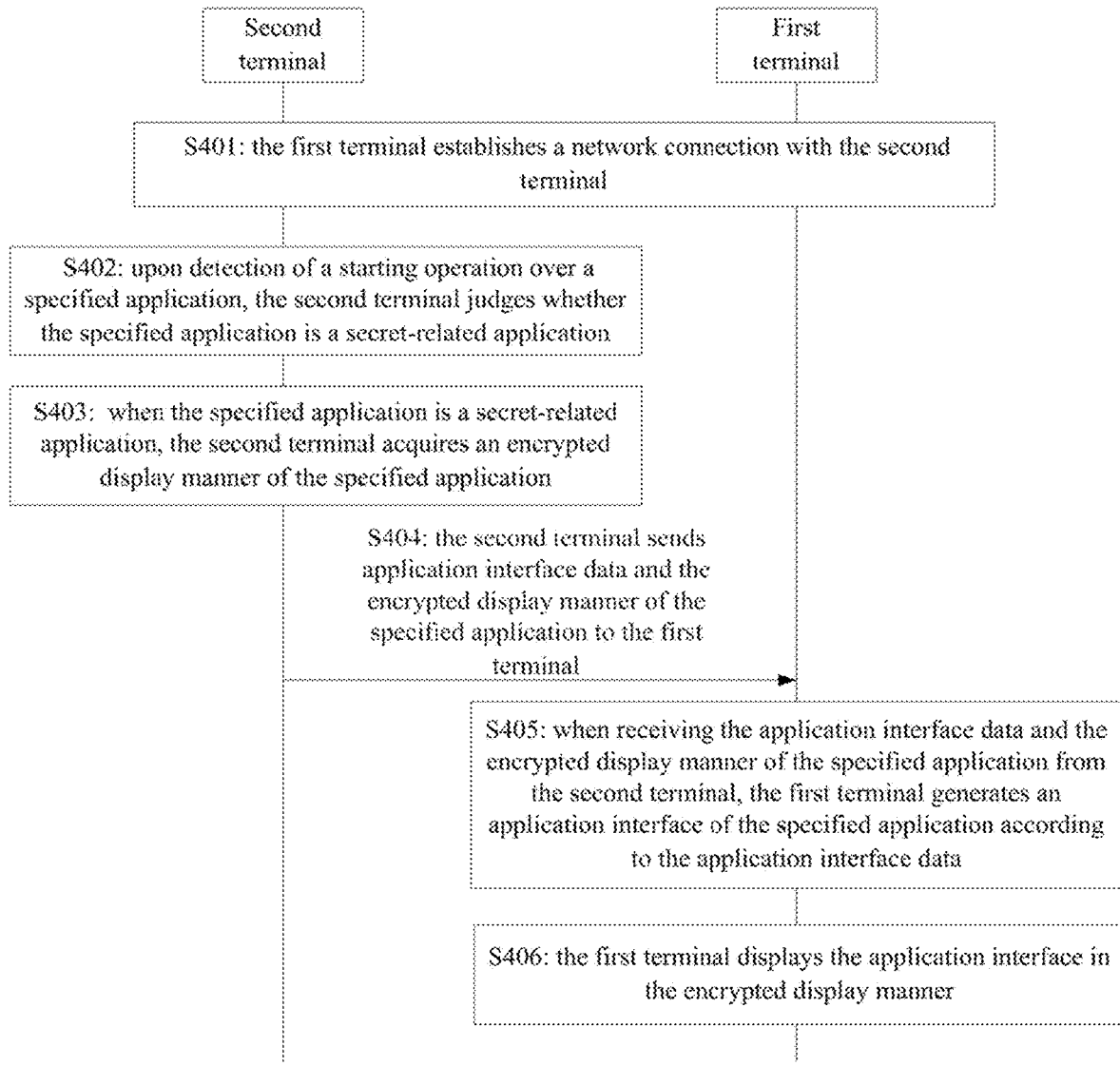
FIG. 4 is a flow chart showing another method for displaying an application interface according to an exemplary aspect of the present disclosure.

FIG. 4 is a flow chart showing a method for displaying an application interface, according to an exemplary aspect. As shown in FIG. 4, the method for displaying the application interface is applied to a first terminal and a second terminal and includes the following steps.

In Step S401, the first terminal establishes a network connection with the second terminal.

In the aspect of the present disclosure, both the first terminal and the second terminal have a network connection function, and the first terminal may establish the network connection with the second terminal based on the network connection function in, but not limited to, the following manners.

The first manner: both the first terminal and the second terminal enable a Wireless Fidelity (WiFi) function, then the first terminal broadcasts a WiFi signal, and the second terminal, when receiving the WiFi signal, establishes the network connection with the first terminal through the WiFi signal.

The second manner: both the first terminal and the second terminal enable a Bluetooth (BT) function and discover each other in a device discovery stage, then the first terminal broadcasts a BT signal, and the second terminal, after receiving the BT signal broadcast by the first terminal, establishes the network connection with the first terminal according to the received BT signal.

The third manner: both the first terminal and the second terminal enable a Near Field Communication (NFC) function, and the first terminal and the second terminal establish an NFC data channel by data packet transmission and further establish the network connection with each other according to the established NFC data channel.

The fourth manner: both the first terminal and the second terminal enable an infrared function and discover each other in the device discovery stage, then the first terminal sends an infrared signal, and the second terminal, after receiving the infrared signal sent by the first terminal, establishes the network connection with the first terminal according to the received infrared signal.

Of course, the first terminal may establish the network connection with the second terminal in other manners, which will not be described in the aspect of the present disclosure one by one.

In Step S402, upon detection of a starting operation over a specified application, the second terminal judges whether the specified application is a secret-related application.

In the aspect of the present disclosure, the second terminal has two modes, one is a privacy protection mode and the other is a non-privacy protection mode. In the privacy protection mode, the second terminal may judge whether the application being started is a secret-related application, and when the application being started is a secret-related application, acquire an encrypted display manner and send application interface data and the encrypted display manner to the first terminal, so as for the first terminal to display an application interface in the encrypted display manner, thereby effectively protecting privacy of a user. In the non-privacy protection mode, the second terminal sends the application interface data to the first terminal for display and would not protect the privacy of the user.

In the aspect of the present disclosure, since the first terminal adopts different display manners for the application interface when the second terminal is in different display modes, when the starting operation over the specified application is detected, the second terminal is required to detect whether a present mode is the privacy protection mode, and when the present mode is the privacy protection mode, judges whether the specified application is a secret-related application.

Specifically, when the second terminal may execute the following steps to judge whether the specified application is a secret-related application.

In Step 4021, the second terminal acquires an application identifier of the specified application.

The application identifier is used to uniquely identify an application, and includes an application name, an application version and the like.

In Step 4022, when the application identifier is the same as an application identifier of a preset secret-related application, the second terminal determines that the specified application is the secret-application.

The second terminal maintains an encrypted application database, a corresponding relationship between application identifiers and encrypted display manners of encrypted applications is stored in the encrypted application database, the encrypted display manners can be used for the first terminal to display application interfaces of the encrypted applications with encrypted effects. The encrypted display manners include a frosted glass effect and the like.

The encrypted application database may be created as follows. The second terminal provides an encrypted application setting interface, and an encrypted application setting option and an encrypted display manner setting option are displayed on the encrypted application setting interface; the user may set applications related to the privacies of the user to be secret-related applications through the encrypted application setting option according to whether each application is secret-related and set an encrypted display manner for each secret-related application according to the encrypted display manner setting option. When the user sets the encrypted display manner for each secret-related application, the same encrypted display manner may be set for all of the encrypted applications, or for each secret-related application, a different encrypted display manner may be set according to a degree of secret relevancy of each secret-related application. The second terminal detects a setting operation of the user on the encrypted application setting interface to acquire the encrypted applications and corresponding encrypted display manners set by the user and accordingly creates the encrypted application database.

Based on the created encrypted application database, the second terminal judges whether the application identifier of the specified application is the same as the application identifier of the preset secret-related application, when the application identifier is the same as the application identifier of the preset secret-related application, determines that the specified application is the secret-related application, and when the application identifier is different from the application identifier of the preset secret-related application, determines that the specified application is the secret-unrelated application and directly sends the application interface data of the specified application to the first terminal for display.

In Step S403, when the specified application is a secret-related application, the second terminal acquires an encrypted display manner of the specified application.

When it is determined that the specified application is a secret-related application, the second terminal further acquires the encrypted display manner corresponding to the application identifier from the pre-created encryption database according to the application identifier of the specified application.

In Step S404, the second terminal sends application interface data and the encrypted display manner of the specified application to the first terminal.

When acquiring the encrypted display manner of the specified application, the second terminal sends the application interface data and the encrypted display manner of the specified application to the first terminal based on the network connection pre-established with the first terminal for the first terminal to display. Of course, an application interface of the second terminal may usually be viewed by the user at a second terminal side only and is invisible for other users, so that the second terminal may normally display an application interface of the specified application.

In Step S405, when receiving the application interface data and the encrypted display manner of the specified application from the second terminal, the first terminal generates an application interface of the specified application according to the application interface data.

Since the application interface data includes interface elements of the application interface to be drawn and display parameters of the interface elements, and a drawing form for the interface elements to be drawn may be determined according to the display parameters of the application interface data, the terminal may draw graphic elements corresponding to the interface elements based on the acquired application interface data and further draw the application interface of the specified application. The graphic element may be a button, an icon and the like. The graphic element is not specifically limited in the aspect of the present disclosure.

In Step S406, the first terminal displays the application interface in the encrypted display manner.

Figure 5:
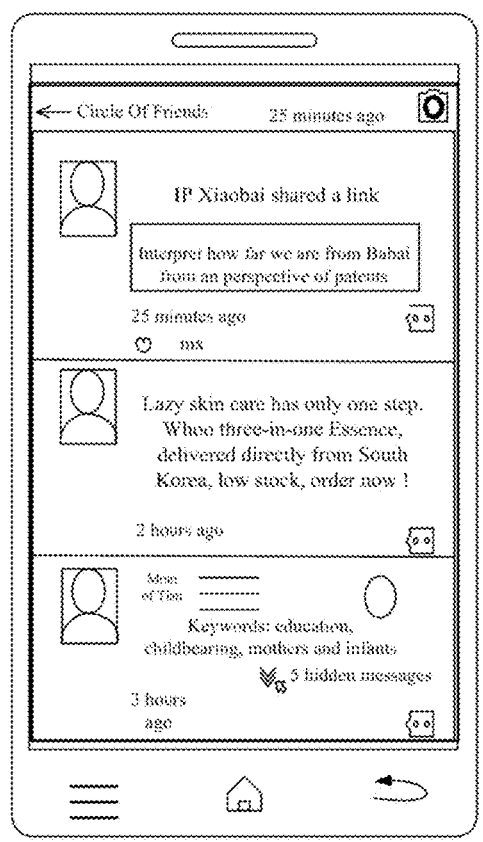
FIG. 5 is a schematic diagram illustrating an interface of a terminal according to an exemplary aspect of the present disclosure.
Figure 5:
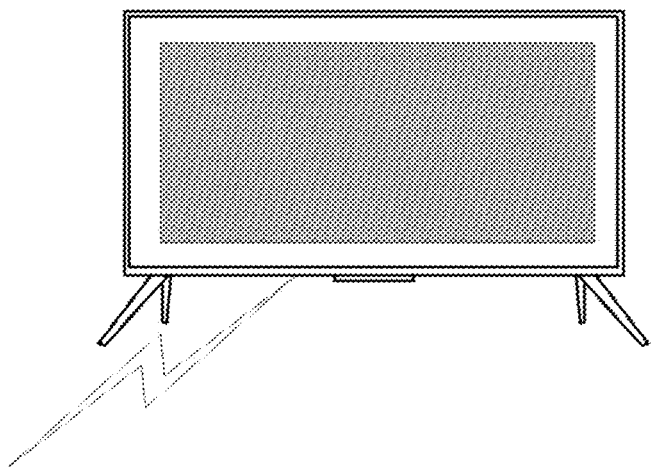

Since the specified application is a secret-related application, for avoiding privacy leakage of the user, the first terminal may display the application interface of the specified application in the encrypted display manner after the application interface of the specified application is drawn. For example, the encrypted display manner is the frosted glass effect, and the application interface of the specified application is displayed with the frosted glass effect. Referring to FIG. 5, the second terminal normally displays the application interface of the specified application and a first terminal displays the application interface of the specified application with the frosted glass effect.

In another aspect of the present disclosure, during display of the application interface, when the second terminal detects a sliding operation on the application interface, the second terminal may acquire a sliding region of the sliding operation and send the sliding region to the first terminal, and the first terminal, when receiving the sliding region sent by the second terminal, displays content of the application interface in the sliding region, so that a user(s) at the first terminal side may view secret-unrelated content on the application interface to achieve an information sharing purpose.

Figure 6:
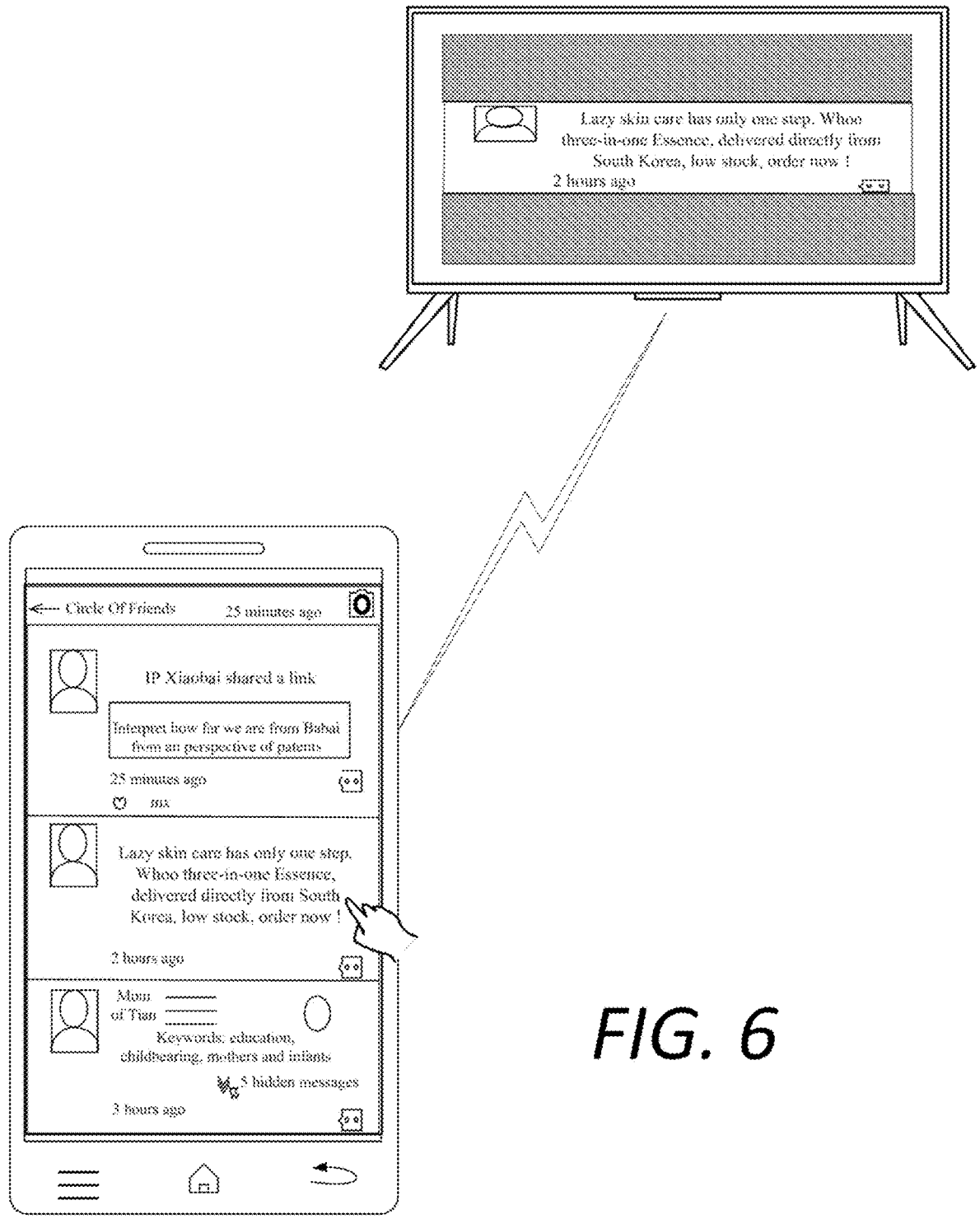
FIG. 6 is a schematic diagram illustrating an interface of a terminal according to an exemplary aspect of the present disclosure.

Referring to FIG. 6, when the sliding operation of the user is detected on the application interface, the second terminal acquires the sliding region of the sliding operation of the user and sends the sliding region to the first terminal, and the first terminal, when receiving the sliding region, cancels the frosted glass effect in the sliding region and displays the application interface content in the sliding region in a normal display manner, so that the user(s) at the first terminal side may view the application interface content in the sliding region.

When the user starts a secret-related application by maloperation, the method provided by the aspect of the present disclosure may not directly display an application interface of the secret-related application but display the application interface in an encrypted display manner instead, thereby effectively protecting the privacy of the user; and when the user starts a secret-related application not by maloperation, and the user may execute a sliding operation on the application interface to display content of the application interface in a sliding region, so that the content on the application interface is selectively presented to the user(s) at the first terminal side.

According to the method provided by the aspect of the present disclosure, before the second terminal projects the application interface of the specified application to the first terminal, it is judged whether the specified application is a secret-related application, and when the specified application is a secret-related application, the application interface data and encrypted display manner of the specified application are sent to the first terminal together, so as for the first terminal to display the application interface in the encrypted display manner, thereby providing a novel application interface display scheme which effectively avoids user privacy leakage.

Figure 7:
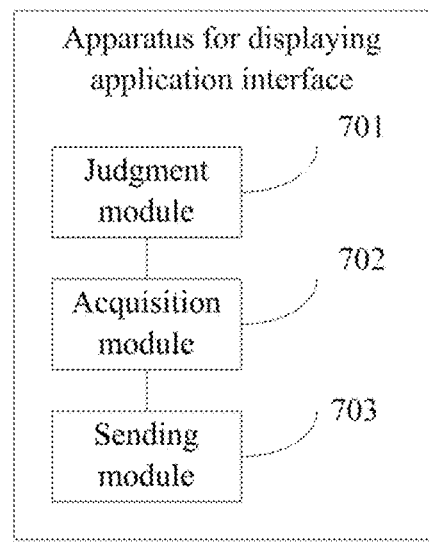
FIG. 7 is a block diagram of an apparatus for displaying an application interface according to an exemplary aspect of the present disclosure.

FIG. 7 is a schematic diagram illustrating an apparatus for displaying an application interface, according to an exemplary aspect. Referring to FIG. 7, the apparatus includes a judgment module 701, an acquisition module 702 and a sending module 703.

The judgment module 701 is configured to, upon detection of a starting operation over a specified application, judge whether the specified application is a secret-related application.

The acquisition module 702 is configured to, when the specified application is a secret-related application, acquire an encrypted display manner of the specified application.

The sending module 703 is configured to send application interface data and the encrypted display manner of the specified application to a first terminal based on a network connection pre-established with the first terminal. The application interface data are used by the first terminal to generate an application interface of the specified application and the encrypted display manner is used by the first terminal to display the application interface with an encrypted effect.

In another aspect of the present disclosure, the judgment module 701 is configured to acquire an application identifier of the specified application, and when the application identifier is the same as an application identifier of a preset secret-related application, determine that the specified application is a secret-related application.

In another aspect of the present disclosure, the acquisition module 702 is configured to acquire the application identifier of the specified application and acquire an encrypted display manner corresponding to the application identifier from an encryption database according to the application identifier. A corresponding relationship between application identifiers and encrypted display manners of encrypted applications is stored in the encryption database.

In another aspect of the present disclosure, the acquisition module 702 is configured to, during display of the application interface, upon detection of a sliding operation on the application interface, acquire a sliding region of the sliding operation.

In this aspect of the present disclosure, the sending module 703 is configured to send the sliding region to the first terminal, so as for the first terminal to display content of the application interface in the sliding region.

In another aspect of the present disclosure, the apparatus further includes a detection module.

The detection module is configured to detect whether a present mode is a privacy protection mode.

In this aspect of the present disclosure, the judgment module 701 is configured to, when the present mode is the privacy protection mode, judge whether the specified application is a secret-related application.

According to the apparatus provided by the aspect of the present disclosure, before the second terminal projects the application interface of the specified application to the first terminal, it is judged whether the specified application is a secret-related application, and when the specified application is a secret-related application, the application interface data and the encrypted display manner of the specified application are sent to the first terminal together, so as for the first terminal to display the application interface in the encrypted display manner, thereby providing a novel application interface display scheme which effectively avoids user privacy leakage.

With respect to the apparatus in the above aspects, the specific manners for performing operations for individual modules therein have been described in detail in the aspects regarding the methods, which will not be elaborated herein.

Figure 8:
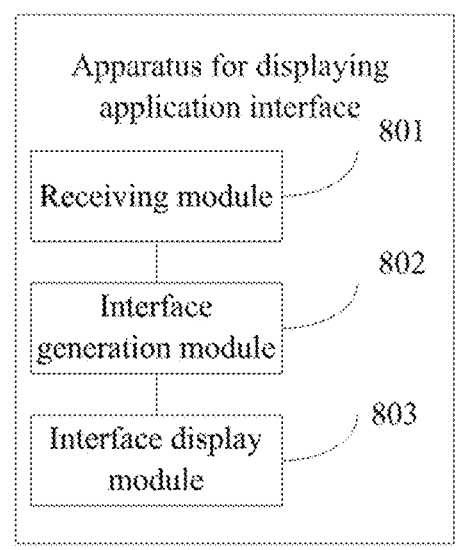
FIG. 8 is a block diagram of another apparatus for displaying an application interface according to an exemplary aspect of the present disclosure.

FIG. 8 is a schematic diagram illustrating an apparatus for displaying an application interface according to an exemplary aspect. Referring to FIG. 8, the apparatus includes a receiving module 801, an interface generation module 802 and an interface display module 803.

The receiving module 801 is configured to receive application interface data and an encrypted display manner of a specified application from a second terminal based on a network connection pre-established with the second terminal. The specified application is an application being started at the second terminal.

The interface generation module 802 is configured to generate an application interface of the specified application according to the application interface data.

The interface display module 803 is configured to display the application interface in the encrypted display manner.

In another aspect of the present disclosure, the receiving module 801 is configured to receive a sliding region sent by the second terminal. The sliding region is determined according to a sliding operation detected by the second terminal on the application interface.

In this aspect of the present disclosure, the interface display module 803 is configured to display content of the application interface in the sliding region.

According to the apparatus provided by the aspect of the present disclosure, the application interface data and the encrypted display manner of the specified application are received from the second terminal, and the application interface is displayed in the encrypted display manner, thereby providing a novel application interface display scheme which effectively avoids user privacy leakage.

Figure 9:
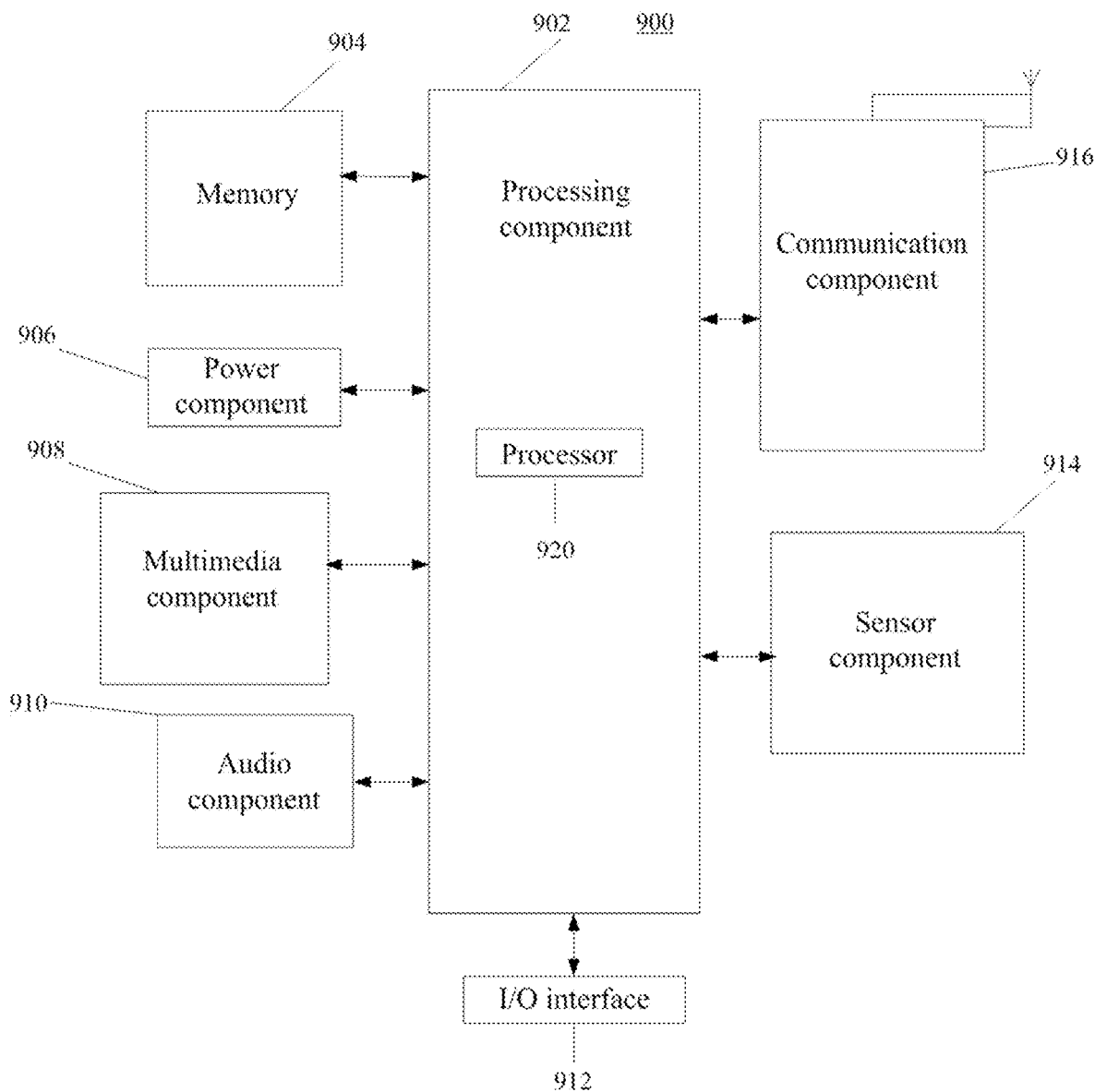
FIG. 9 is a block diagram of an apparatus for displaying an application interface according to an exemplary aspect of the present disclosure.

FIG. 9 is a block diagram of an apparatus 900 for displaying an application interface according to an exemplary aspect. For example, the apparatus 900 may be a mobile phone, a computer, a digital broadcast terminal, a messaging device, a gaming console, a tablet, a medical device, exercise equipment, a personal digital assistant, and the like.

Referring to FIG. 9, the apparatus 900 may include one or more of the following components: a processing component 902, a memory 904, a power component 906, a multimedia component 908, an audio component 910, an Input/Output (I/O) interface 912, a sensor component 914, and a communication component 916.

The processing component 902 typically controls overall operations of the apparatus 900, such as the operations associated with display, telephone calls, data communications, camera operations, and recording operations. The processing component 902 may include one or more processors 920 to execute instructions to perform all or part of the steps in the abovementioned method. Moreover, the processing component 902 may include one or more modules which facilitate interaction between the processing component 902 and the other components. For instance, the processing component 902 may include a multimedia module to facilitate interaction between the multimedia component 908 and the processing component 902.

The memory 904 is configured to store various types of data to support the operation of the apparatus 900. Examples of such data include instructions for any application programs or methods operated on the apparatus 900, contact data, phonebook data, messages, pictures, video, etc. The memory 904 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 906 provides power for various components of the apparatus 900. The power component 906 may include a power management system, one or more power supplies, and other components associated with the generation, management and distribution of power for the apparatus 900.

The multimedia component 908 includes a screen providing an output interface between the apparatus 900 and a user. In some aspects, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a duration and pressure associated with the touch or swipe action. In some aspects, the multimedia component 908 includes a front camera and/or a rear camera. The front camera and/or the rear camera may receive external multimedia data when the apparatus 900 is in an operation mode, such as a photographing mode or a video mode. Each of the front camera and the rear camera may be a fixed optical lens system or have focusing and optical zooming capabilities.

The audio component 910 is configured to output and/or input an audio signal. For example, the audio component 910 includes a Microphone (MIC), and the MIC is configured to receive an external audio signal when the apparatus 900 is in the operation mode, such as a call mode, a recording mode and a voice recognition mode. The received audio signal may be further stored in the memory 904 or sent through the communication component 916. In some aspects, the audio component 910 further includes a speaker configured to output the audio signal.

The I/O interface 912 provides an interface between the processing component 902 and a peripheral interface module, and the peripheral interface module may be a keyboard, a click wheel, a button and the like. The button may include, but not limited to: a home button, a volume button, a starting button and a locking button.

The sensor component 914 includes one or more sensors configured to provide status assessment in various aspects for the apparatus 900. For instance, the sensor component 914 may detect an on/off status of the apparatus 900 and relative positioning of components, such as a display and small keyboard of the apparatus 900, and the sensor component 914 may further detect a change in a position of the apparatus 900 or a component of the apparatus 900, presence or absence of contact between the user and the apparatus 900, orientation or acceleration/deceleration of the apparatus 900 and a change in temperature of the apparatus 900. The sensor component 914 may include a proximity sensor configured to detect presence of an object nearby without any physical contact. The sensor component 914 may also include a light sensor, such as a Complementary Metal Oxide Semiconductor (CMOS) or Charge Coupled Device (CCD) image sensor, configured for use in an imaging application. In some aspects, the sensor component 914 may also include an acceleration sensor, a gyroscope sensor, a magnetic sensor, a pressure sensor or a temperature sensor.

The communication component 916 is configured to facilitate wired or wireless communication between the apparatus 900 and other equipment. The apparatus 900 may access a communication-standard-based wireless network, such as a WiFi network, a 2nd-Generation (2G) or 3rd-Generation (3G) network or a combination thereof. In an exemplary aspect, the communication component 916 receives a broadcast signal or broadcast associated information from an external broadcast management system through a broadcast channel. In an exemplary aspect, the communication component 916 further includes a NFC module to facilitate short-range communication. For example, the NFC module may be implemented based on a Radio Frequency Identification (RFID) technology, an Infrared Data Association (IrDA) technology, an Ultra-WideBand (UWB) technology, a BT technology and another technology.

In an exemplary aspect, the apparatus 900 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary aspect, there is also provided a non-transitory computer-readable storage medium including an instruction, such as the memory 904 including an instruction, and the instruction may be executed by the processor 920 of the apparatus 900 to implement the abovementioned method. For example, the non-transitory computer-readable storage medium may be a ROM, a Random Access Memory (RAM), a Compact Disc Read-Only Memory (CD-ROM), a magnetic tape, a floppy disc, optical data storage equipment and the like.

A non-transitory computer-readable storage medium is provided. An instruction in the storage medium is executed by a processor of a mobile terminal to enable the mobile terminal to execute a method for displaying an application interface shown in FIG. 2, 3 or 4.

According to the non-transitory computer-readable storage medium provided by the aspect of the present disclosure, before a second terminal projects an application interface of a specified application to a first terminal, it is judged whether the specified application is a secret-related application, and when the specified application is a secret-related application, application interface data and encrypted display manner of the specified application are sent to the first terminal together for the first terminal to display the application interface in the encrypted display manner, thereby providing a novel application interface display scheme which can effectively avoid user privacy leakage.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

INDUSTRIAL APPLICABILITY

The technical solutions provided by the aspects of the present disclosure may have the following beneficial effects: before the second terminal projects the application interface of the specified application to the first terminal, it is judged whether the specified application is a secret-related application, and when the specified application is a secret-related application, the application interface data and the encrypted display manner of the specified application are sent to the first terminal together, so as for the first terminal to display the application interface in the encrypted display manner, thereby providing a novel application interface display scheme which can effectively avoid user privacy leakage.

What is claimed is:

1. A method for displaying an application interface, comprising:
    detecting a starting operation over a specified application;
    in response to detecting the starting operation over the specified application, determining whether the specified application is a secret-related application;
    when the specified application is determined to be the secret-related application, acquiring an application identifier of the specified application, and acquiring an encrypted display manner corresponding to the application identifier from an encryption database based on the application identifier, wherein corresponding relationships between application identifiers and encrypted display manners of encrypted applications are stored in the encryption database; and
    sending application interface data and the encrypted display manner of the specified application to a first terminal based on a network connection pre-established with the first terminal, wherein the application interface data is used by the first terminal to generate an application interface of the specified application, and the encrypted display manner is used by the first terminal to display the application interface with an encrypted effect.

2. The method of claim 1, wherein determining whether the specified application is a secret-related application comprises:
    acquiring the application identifier of the specified application; and
    when the application identifier is as same as an application identifier of a preset secret-related application, determining that the specified application is the secret-related application.

3. The method of claim 1, wherein after sending the application interface data and the encrypted display manner of the specified application to the first terminal, the method further comprises:
    during display of the application interface, upon detection of a sliding operation on the application interface, acquiring a sliding region of the sliding operation; and
    sending the sliding region to the first terminal, so as for the first terminal to display content of the application interface in the sliding region.

4. The method of claim 1, wherein before determining whether the specified application is the secret-related application, the method further comprises:
    determining whether the first terminal is in a privacy protection mode; and
    when the first terminal is in the privacy protection mode, determining whether the specified application is the secret-related application.

5. An apparatus for displaying an application interface, comprising:
    a processor; and
    a memory configured to store instructions executable by the processor,
    wherein the processor is configured to:
        detect a starting operation over a specified application;
        in response to detecting the starting operation over the specified application, determine whether the specified application is a secret-related application;
        when the specified application is determined to be the secret-related application, acquire an application identifier of the specified application, and acquire an encrypted display manner corresponding to the application identifier from an encryption database based on the application identifier, wherein corresponding relationships between application identifiers and encrypted display manners of encrypted applications are stored in the encryption database; and
        send application interface data and the encrypted display manner of the specified application to a first terminal based on a network connection pre-established with the first terminal, wherein the application interface data are used by the first terminal to generate an application interface of the specified application, and the encrypted display manner is used by the first terminal to display the application interface with an encrypted effect.

6. The apparatus of claim 5, wherein the processor is further configured to:
   acquire the application identifier of the specified application; and
   when the application identifier is as same as an application identifier of a preset secret-related application, determine that the specified application is the secret-related application.

7. The apparatus of claim 5, wherein the processor is further configured to:
   during display of the application interface, upon detection of a sliding operation on the application interface, acquire a sliding region of the sliding operation; and
   send the sliding region to the first terminal, so as for the first terminal to display content of the application interface in the sliding region.

8. The apparatus of claim 5, wherein the processor is further configured to:
   determine whether the first terminal is in a privacy protection mode; and
   when the first terminal is in the privacy protection mode, determine whether the specified application is the secret-related application.

* * * * *